W. F. GROENE.
LATHE.
APPLICATION FILED JUNE 11, 1918.
1,363,506.
Patented Dec. 28, 1920.
6 SHEETS—SHEET 1.
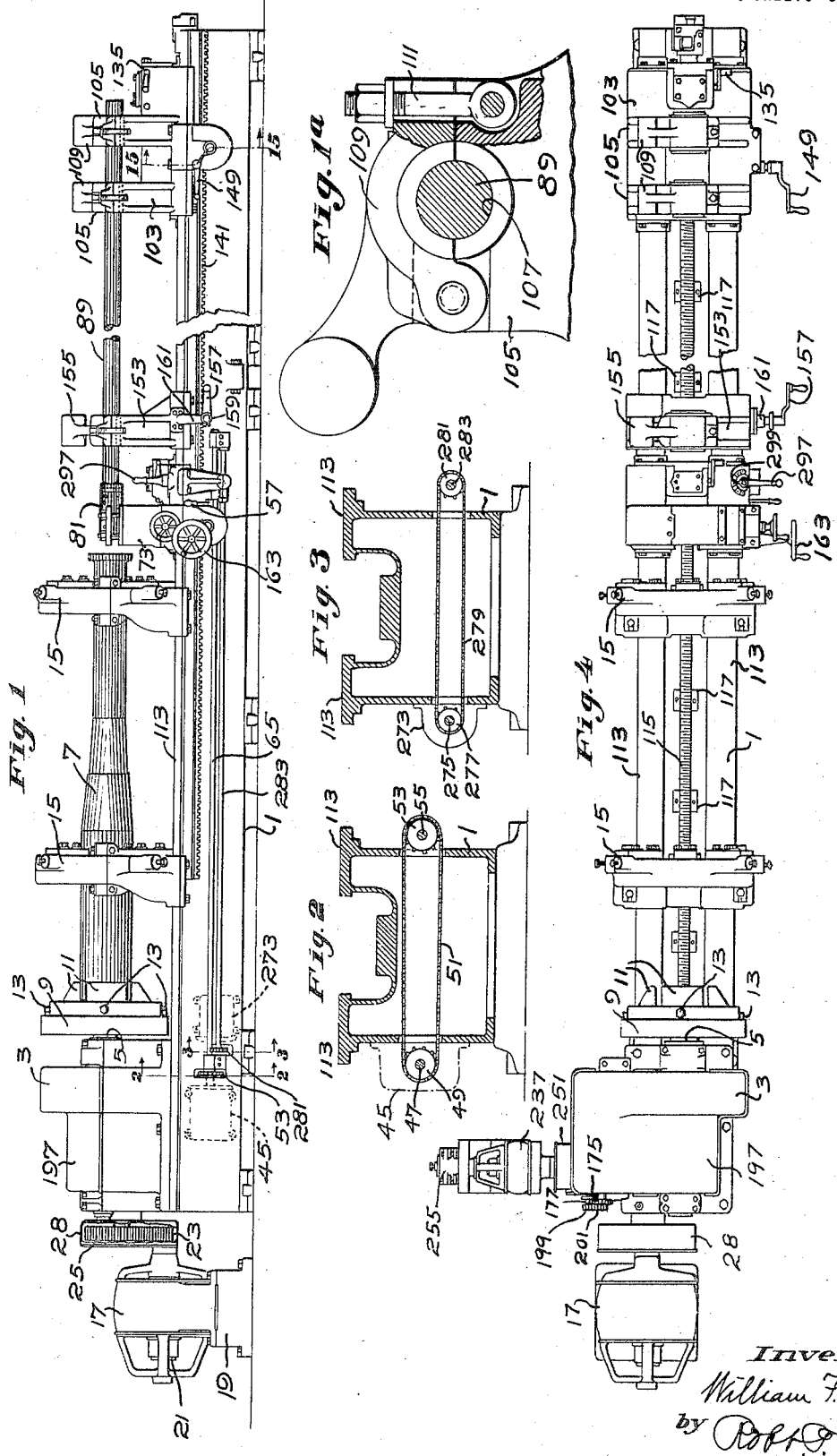
Inventor:
William F. Groene
by Robt. F. Haines
Attorney W. F. GROENE.
LATHE.
APPLICATION FILED JUNE 11, 1918.
1,363,506.
Patented Dec. 28, 1920.
6 SHEETS—SHEET 2.
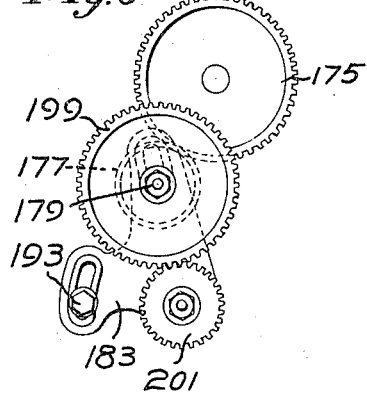
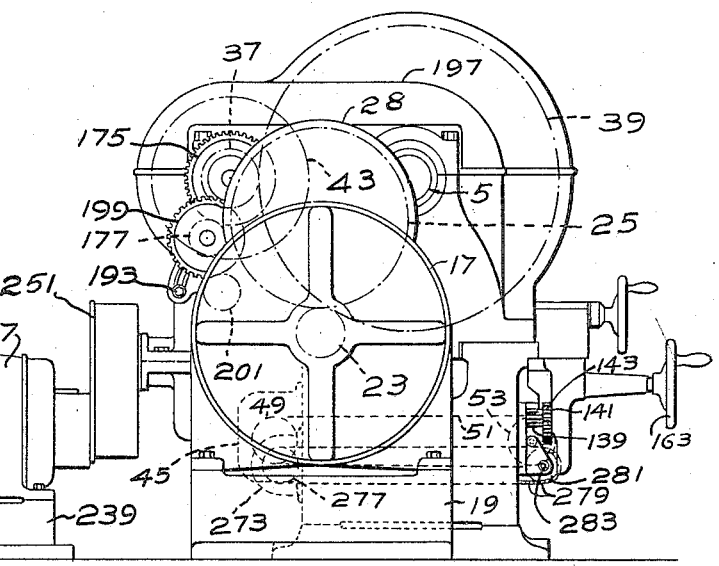
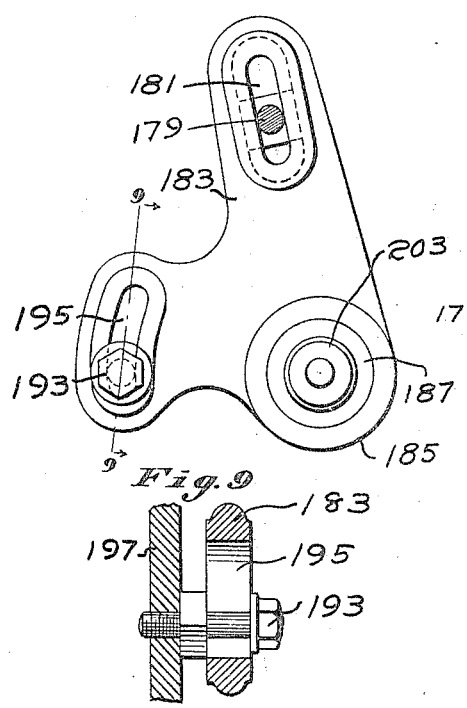
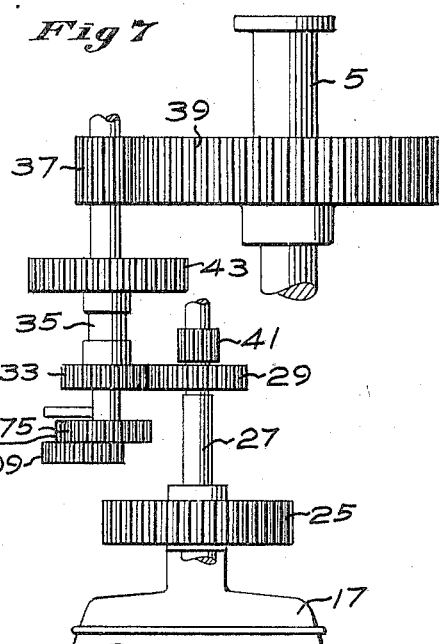
Inventor:
William F. Groene
by Robt. F. Davis
Attorney

W. F. GROENE.
LATHE.
APPLICATION FILED JUNE 11, 1918.

1,363,506.

Patented Dec. 28, 1920.
6 SHEETS—SHEET 3.

Inventor:
William F. Groene
By Robt. D. Hains
Attorney

W. F. GROENE.
LATHE.
APPLICATION FILED JUNE 11, 1918.
1,363,506.
Patented Dec. 28, 1920.
6 SHEETS—SHEET 4.
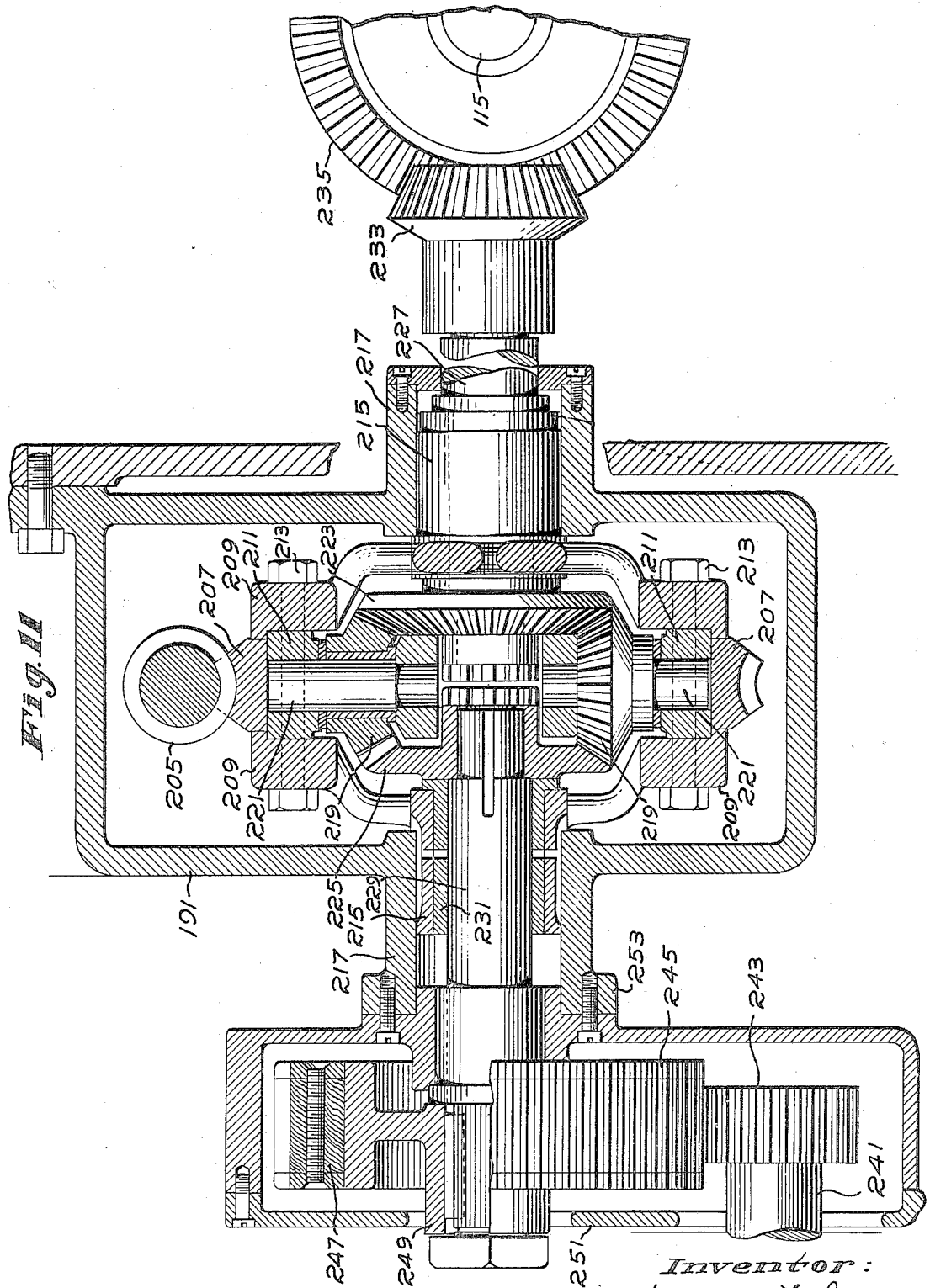

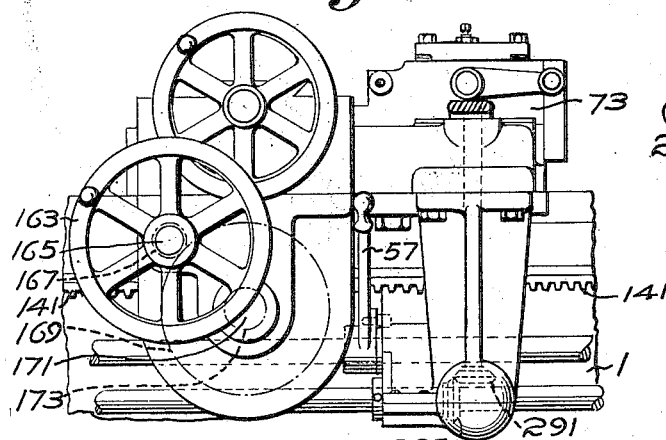
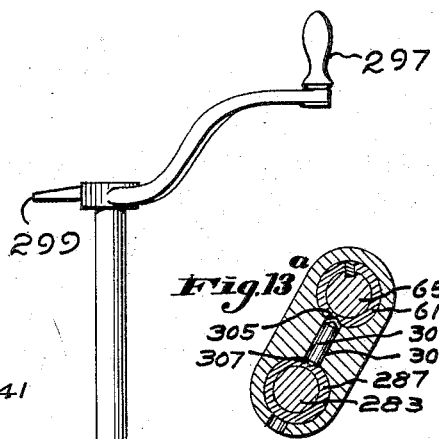
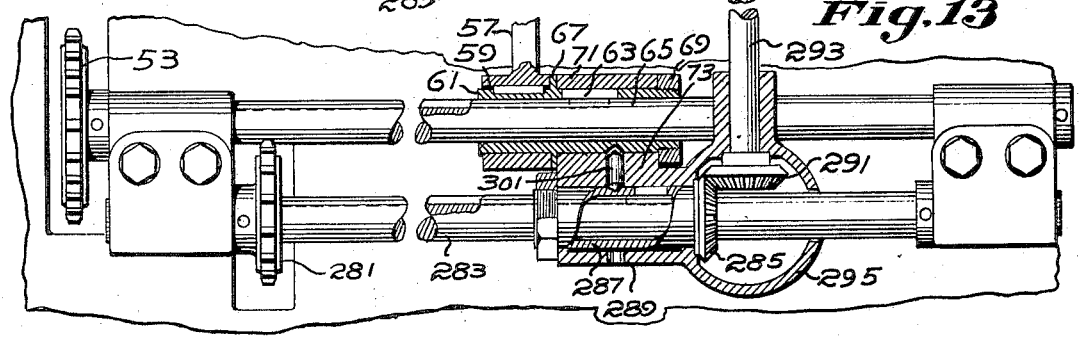
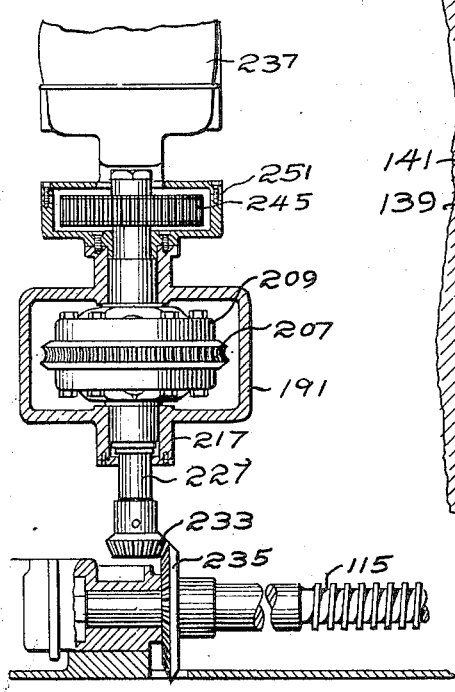
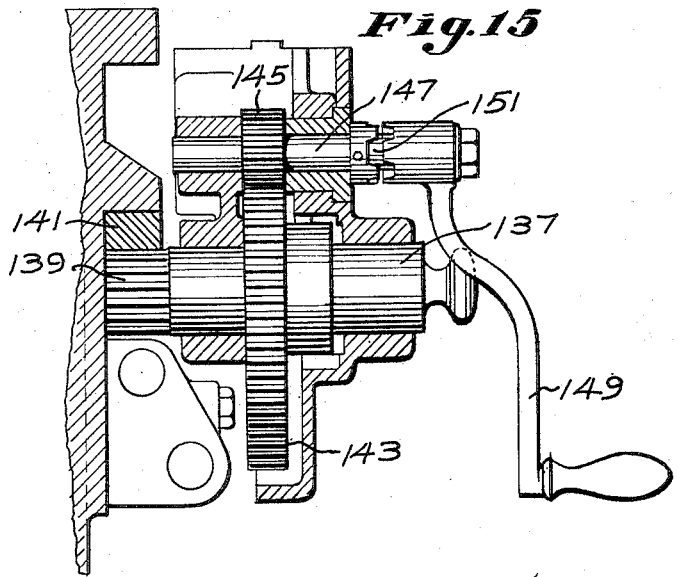

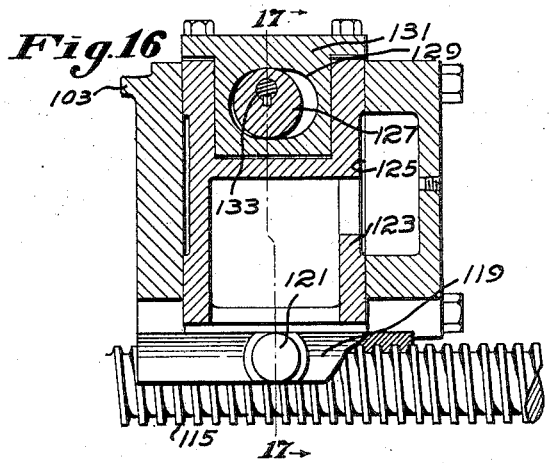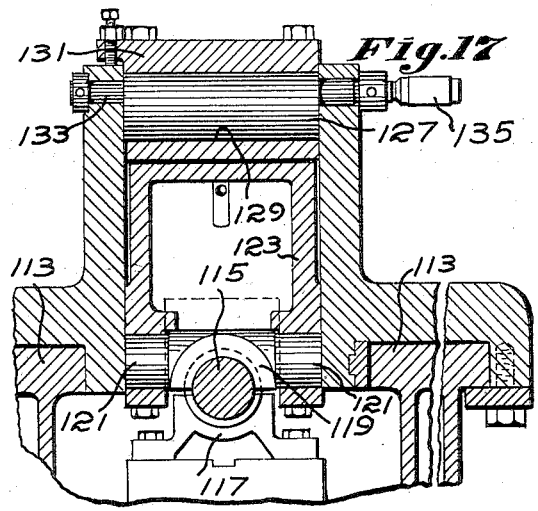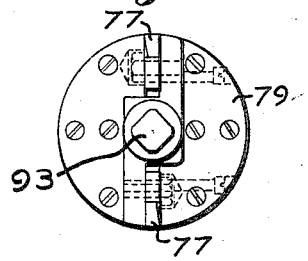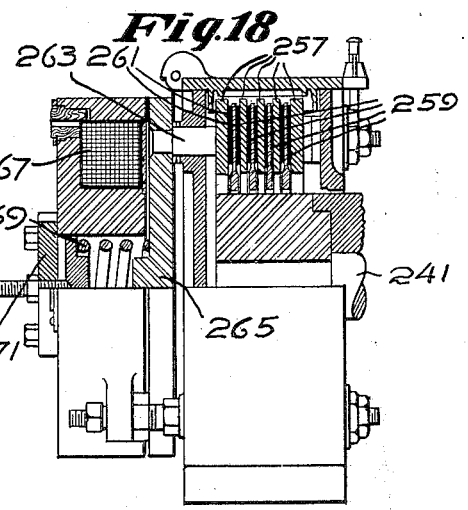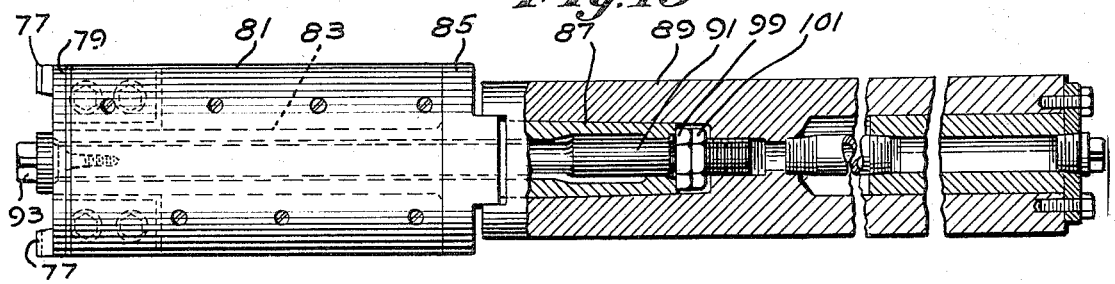

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF OHIO.

LATHE.

1,363,506.        Specification of Letters Patent.        Patented Dec. 28, 1920.

Application filed June 11, 1918. Serial No. 239,468.

*To all whom it may concern:*

Be it known that I, WILLIAM F. GROENE, a citizen of the United States, residing at Cincinnati, county of Hamilton and State of Ohio, have invented an Improvement in Lathes, of which the following description, in connection with the accompanying drawings, is a specification, like characters on the drawings representing like parts.

The invention hereinafter described relates to lathes and more particularly to lathes suitable for boring the barrels of guns and the like.

Lathes for this purpose usually comprise a bed supporting a head stock and its spindle for rotating the work, and a tail stock carrying the boring tool which is fed toward the head stock while the work is rotated. After the tool has been fed to produce the length of bore required, the tail stock and perforce the tool, are given a rapid traverse along the bed in order to withdraw the tool from the work. The rotation of the head stock spindle and the feed of the tail stock have been obtained by transmission mechanism, including clutches and other devices for bringing the work feed and rapid traverse feed of the tail stock selectively into operation and for arresting said feeds; but these have been found to be objectionable for various reasons. Among others, they start the feeds and change from one to another with an abruptness which produces serious shock and jar to the mechanism, resulting in wear and tear on the working parts which soon produces lost motion and impairs the efficiency of the mechanism and shortens the life thereof.

One of the purposes of the present invention is to provide a simple and effective driving mechanism for imparting the work feed and rapid traverse to the tail stock and for changing from one feed to the other without the objectionable shock and jar, referred to. In the present instance of the invention, one motor is used to rotate the head stock spindle and impart the work feed to the tail stock, and another motor is used to impart the rapid traverse feed to the tail stock, and means is provided for transmitting the drive from said motors including a differential gear mechanism; the construction being such that both motors may be always engaged without break in the transmission mechanism, and the work feed and rapid traverse feed may be selectively thrown into and out of operation at will by control of the motors.

Another object of the invention is to provide simple and efficient means whereby the tail stock may be fed either automatically or manually as desired.

Various other features of the present invention in addition to the above will be hereinafter described in connection with the accompanying drawings, showing one good form of means for carrying the invention into practical effect.

In the drawings:—

Figure 1 is a side elevation of the lathe shown herein as embodying the invention;

Fig. 1ª is an end elevation of a portion of one of the uprights of the tail stock showing the means for clamping the boring bar thereon;

Fig. 2 on an enlarged scale is a vertical section taken on line 2—2 of Fig. 1.

Fig. 3 on an enlarged scale is a vertical section taken on line 3—3 of Fig. 1;

Fig. 4 is a plan of the lathe shown in Fig. 1;

Fig. 5 on an enlarged scale is an end elevation of the lathe shown in Figs. 1 and 4;

Fig. 6 is a detail view showing change gears in the transmission to the tail stock feed screw;

Fig. 7 is a plan view showing gears in the transmission from one of the motors to the work rotating spindle;

Figure 10:
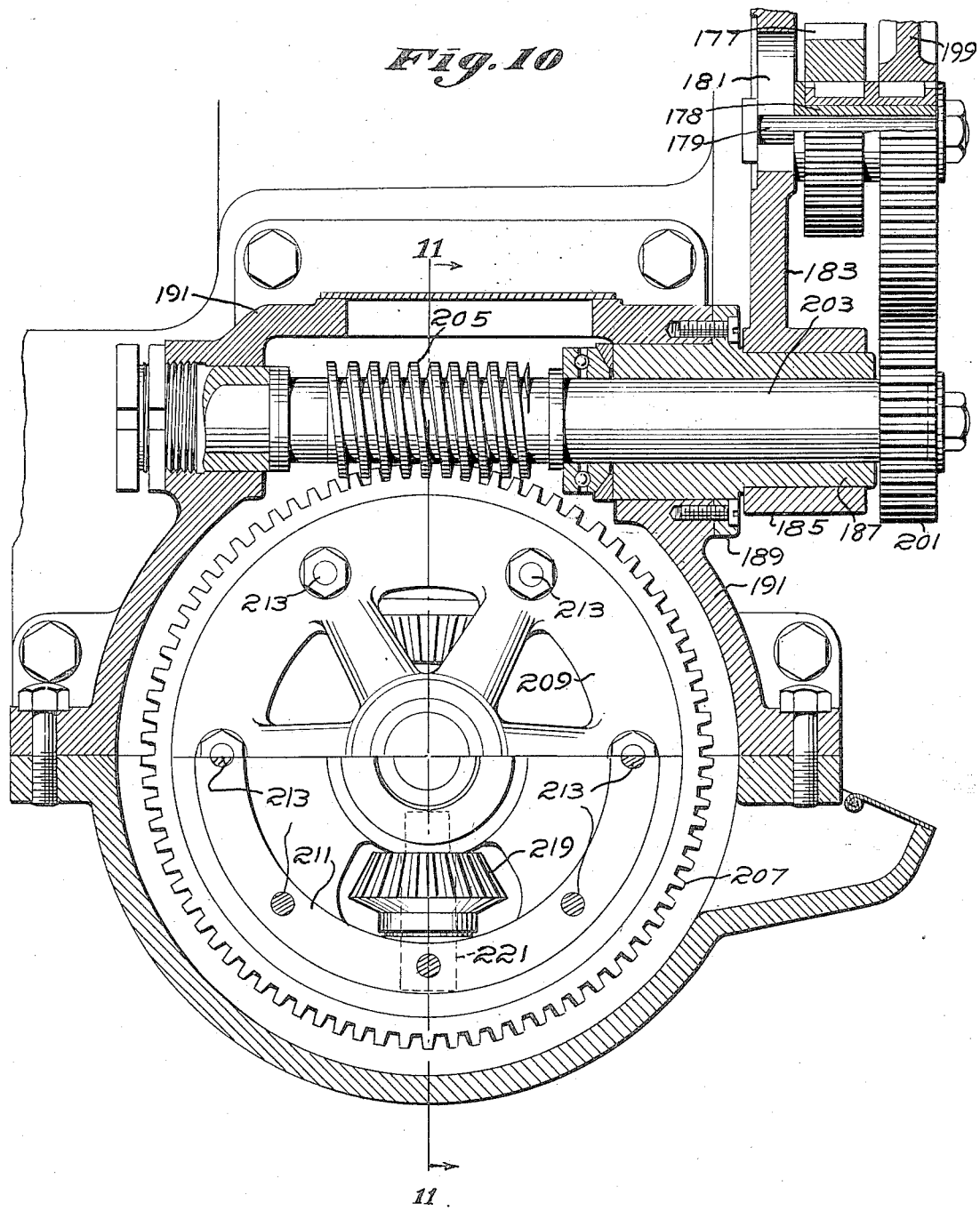

Fig. 8 on an enlarged scale is a side elevation of the adjustable quadrant for the change gears shown in Fig. 6;

Fig. 9 is a sectional detail taken on line 9—9 of Fig. 8;

Fig. 10 is a vertical section through a part of the transmission for the tail stock feed screw including a differential gear mechanism;

Fig. 11 is a vertical section taken on line 11—11 of Fig. 10;

Fig. 12 is a front elevation of a carriage for the tool, and shows the controlling levers for the motors;

Fig. 13 on an enlarged scale is a side elevation of means for transmitting movements from the motor control handles to the motor controllers;

Fig. 13ª is a view of a detail to be referred to;

Fig. 14 is a view partly in plan and partly in horizontal section showing the rapid traverse motor, the differential gear mechanism, and other elements in the transmission to the tail stock feed screw;

Fig. 15 on an enlarged scale is a vertical section taken on line 15—15 of Fig. 1;

Fig. 16 is a vertical section through the tail stock and feed screw;

Fig. 17 is a vertical section taken on line 17—17 of Fig. 16;

Fig. 18 on an enlarged scale is a view partly in side elevation and partly in vertical section of the solenoid brake for arresting the armature shaft of the rapid traverse motor;

Fig. 19 is a side elevation of the boring tool and a vertical section through the boring bar carrying the tool; and Fig. 20 is an elevation of the face of the tool.

Referring to the drawings, the lathe shown therein as embodying the invention comprises a bed 1 (Figs. 1 and 4) supporting a head stock 3 in which is journaled a spindle 5 adapted to rotate the work. For purposes of illustration, the work to be rotated is shown in the form of a gun 7 which may be connected to rotate with the spindle 5 by a face plate 9 secured to the spindle and having jaws 11 adapted to be adjusted by screws 13 to grip the gun, the construction being such that rotation of the spindle will rotate the gun. To position the gun in axial alinement with the spindle, suitable supports 15 may be mounted on the bed and be properly spaced axially of the gun. Since these supports may be of usual construction, it is unnecessary to describe the same in detail herein.

Suitable means may be provided to rotate the spindle. In the present instance of the invention, this is accomplished by an electric motor 17 (Figs. 1 and 4) mounted on a base 19 adjacent one end of the bed 1. The armature shaft 21 of the motor has a pinion 23 (Fig. 1) fast thereon meshing with a large gear 25 above it and mounted fast on a countershaft 27 (Fig. 7), said pinion and gear being inclosed in a suitable casing 28. A gear 29 fast on said shaft is adapted to mesh with a gear 33 fast on a back shaft 35 which also has a pinion 37 fast thereon meshing with a large gear 39 fast on the spindle 5.

By the train of gears described, the spindle 5 may be driven at one speed from the motor. To furnish a slower speed for the spindle, a pinion 41 may be mounted on the countershaft 27 and adapted to mesh with the gear 43 fast on the back shaft 35. The gear 29 and pinion 41 may be splined to the counter-shaft so that they may slide axially thereof to cause either the gear 29 to mesh with the gear 33 or the pinion 41 to mesh with the gear 43 according to the speed desired.

A controller 45 (Figs. 1 and 2) of usual construction may be provided for the spindle driving motor, and may be mounted at the rear of the bed 1. To enable operation of this controller from the front of the lathe, the shaft 47 of the controller may have a sprocket wheel 49 fast thereon connected by a sprocket chain 51 with a sprocket wheel 53 fast on a long shaft 55 journaled in bearings mounted on the front of the bed. This shaft projects parallel to said bed toward a point substantially midway between the ends of the bed, where it is provided with a handle 57 (Figs. 1, 12 and 13) projecting from a hub 59 (Fig. 13) keyed to a sleeve 61 having in turn a key 63 adapted to slide in a groove 65 extending longitudinally of said shaft. The sleeve is confined by a flange 67 and a nut 69 in a boss 71 projecting from a tool supporting carriage 73, more fully hereinafter described. The construction is such that the handle may be rocked in the various positions of the carriage, to control the speed of the spindle driving motor and the starting and stopping thereof as required.

A suitable tool is adapted to be fed toward the head stock while the work is rotated to bore the same or perform another operation thereon as required. In the present instance of the invention, a boring tool 75 (Figs. 1, 19 and 20) is provided comprising cutters 77 secured in a plate 79 secured by screws to a block 81 of wood or other suitable material. A tube 83 projects through said block and has a flange 85 engaging the rear end of the block, and a tapered shank 87 projecting into a tapered socket in a long boring bar 89. This shank is secured in said socket by a long draw bolt 91 having a head 93 engaging the cutter plate and its opposite end tapped into the bore of the boring bar. When this draw bolt is tightened it will draw the tool shank into the tapered socket of the boring bar with a tight friction fit. A nut 99 may be threaded on the draw bolt in the recess of the boring bar and engage the end of the tool shank, said nut being secured by a lock nut 101. The construction is such that the draw bolt may be adjusted to cause the nut 99 to press against the shank of the tool and force the same from the boring bar to free the tool therefrom.

Suitable means is provided to support and feed the boring bar and perforce the tool axially of the work. To accomplish this, in the present instance of the invention, a tail stock 103 (Figs. 1, 4, 16 and 17) may be mounted on the bed 1 and have a pair of uprights 105 rising therefrom provided with curved seats 107 adapted to receive the boring bar. Clamps 109 are hinged to said uprights and provided with swing bolts 111 which may be rocked into positions to clamp the boring bar in said seats, or may be rocked to release the same as required.

The tail stock may be fed along rails 113 (Fig. 17) on the bed to feed the tool toward and from the head stock. To feed the tail stock along said rails, a long screw shaft 115 (Figs. 4, and 16) may extend substantially the length of the bed between said rails and be journaled in suitable bearings mounted on the bed. Half bearings 117 may be mounted at intervals on the bed to maintain the screw shaft in proper alinement between its bearings.

It is desirable to automatically feed the tail stock along the bed by power, and at times it is desirable to feed the tail stock manually along the bed. Therefore, suitable means may be provided to connect the tail stock with the feed screw and disconnect the same therefrom. In the present instance of the invention, this is accomplished by a half nut 119 of bronze or other suitable material having trunions 121 journaled in bearings carried by a block 123 adapted to be adjusted vertically in a guideway 125 in the tail stock. An eccentric 127 is mounted in an elongated opening 129 in a bushing 131 carried by the block 123, said eccentric being fast on a shaft 133 journaled in bearings in the tail stock and having a crank 135 fast thereon. The construction is such that the handle may be rocked to turn the eccentric and lift the block and half nut up out of mesh with the screw shaft, or the handle may be rocked to lower the half nut into mesh with the screw shaft as desired. The half nut trunions may rock in their bearings to permit the half nut to adjust itself into proper meshing relation with the screw shaft.

When the half nut is lowered into mesh with the screw shaft, rotation of the latter will feed the tail stock automatically along the bed. When the half nut is lifted out of mesh with the screw shaft, the tail stock may be fed manually along the bed. To produce the latter operation, the tail stock may have a stud shaft 137 (Fig. 15) journaled therein and provided with a pinion 139 adapted to mesh with a rack 141 mounted on the front of the bed and extending longitudinally thereof. The stud shaft 137 has a large gear 143 fast thereon meshing with a pinion 145 fast on a stud shaft 147 journaled in bearings in the tail stock and carrying a handle 149 adapted to be connected to and disconnected from the stud shaft 147 by a clutch 151. The construction is such that the handle may be rotated, and through the gears described, cause the pinion 131 to roll along the rack 141 and thereby feed the tail stock along the bed.

To further contribute to the positioning of the boring bar, a support 153 (Figs. 1 and 4) may be mounted on the rails of the bed intermediate the ends of the boring bar, and the latter may be secured to said bar by a clamp 155 similar to the clamps 109 for the tail stock. This support may be fed along the rails by a handle 157 on a shaft carrying a pinion 159 adapted to mesh with the rack 141, said shaft being carried by a hanger 161 depending from the support.

The carriage 73, referred to, may further contribute to the support of the tool, said carriage being also mounted on the rails on the bed. This carriage may be fed along the bed to the position required by a hand wheel 163 (Fig. 12) fast on a shaft 165 journaled in a bearing in the carriage and carrying a pinion 167 meshing with a gear 169 on a shaft 171 journaled in bearings in said carriage and carrying a pinion 173 meshing with the rack 141.

Next will be described the means for rotating the feed screw to feed the tail stock and tool along the bed relatively to the work. In the present instance of the invention, the motor for rotating the spindle is also utilized to rotate said feed screw, and the transmission mechanism for rotating the feed screw is conveniently driven from the back shaft 35, referred to, rotated by the spindle driving motor. This transmission mechanism, in the present embodiment of the invention, comprises a gear 175 (Figs. 4, 6 and 7) fast on the back shaft 35 and meshing with a gear 177 keyed on a sleeve 178 loose on a bolt 179 adjustably secured in an elongated slot 181 in a quadrant 183 (Figs. 8 and 10) having a hub 185 fulcrumed on a sleeve bearing 187 having a flange 189 secured to the box 191 inclosing a mechanism to be described. The quadrant may be secured in different positions of angular adjustment by a screw bolt 193 (Figs. 5, 6, 7 and 8) entered through an elongated slot 195 in the quadrant and tapped into the casing 197 for the mechanism adjacent the head stock.

The sleeve shaft 178 has a gear 199 (Figs. 6 and 10) keyed thereto and adapted to mesh with a gear 201 fast on a shaft 203 journaled in bearings in the box 191, referred to. The construction described is such that different sized gears may be substituted for the four gears 175, 177, 199 and 201, and the quadrant may be adjusted to cause said substitute gears to mesh properly and furnish a variety of speeds as required.

Next will be described the means in the transmission to the feed screw shaft which eliminates the necessity for the use of clutches or other devices in controlling the speed of the feed screw and the starting and stopping thereof. In the present instance of the invention, this means is in the form of a differential gear mechanism comprising a worm 205 (Figs. 10 and 11) meshing with a large worm gear 207 in the form of a ring mounted on a rotary member, in the present instance, comprising opposed spiders 209 spaced by a ring 211 and secured thereto by bolts 213. These spiders have hubs 215 journaled in boss bearings 217 projecting laterally from the box 191, referred to. Bevel pinions or planet gears 219 are journaled on stud shafts 221 secured to and projecting radially inward from the ring 211, referred to. These bevel pinions mesh with opposed bevel gears or sun gears 223 and 225 fast on shafts 227 and 229 respectively, journaled in bushings 231 in the spider hubs 215.

The shaft 227 may project inward toward and transversely to the screw shaft and have a bevel pinion 233 (Figs. 11 and 14) fast thereon meshing with a bevel gear 235 fast on the screw shaft.

When it is desired to impart a slow feed to the screw shaft suitable for feeding the tail stock and tool toward the work to bore the same or produce other operation of the tool, the shaft 229 carrying the sun gear 225 is held stationary by means to be described, and then the spindle driving motor, through the train of gearing described, will rotate the worm 205 and worm gear 207, thereby causing the planet gears to revolve and roll around the stationary sun gear 225 and rotate the sun gear 223. This will rotate the shaft 227, bevel pinion 233, bevel gear 235 and screw shaft.

It is desirable to rotate the screw shaft to produce a rapid traverse of the tail stock along the bed, in order to bring said tail stock quickly to a predetermined position, such, for example, as a position in which the tool is withdrawn from the barrel of the gun after having completed the boring operation.

Suitable means is provided to rapidly rotate the screw shaft to produce this rapid traverse. In the present instance of the invention, this means comprises an electric motor 237 (Figs. 4, 5 and 14) mounted on a base 239 adjacent the end of the bed 1 where the spindle rotating motor is located. The rapid traverse motor has an armature shaft 241 having a pinion 243 (Fig. 11) fast thereon meshing with a large gear 245 having teeth 247 of raw hide or other suitable material to provide desirable quiet operation, said gear having a hub 249 keyed to the shaft 229, referred to, carrying the sun gear 225. The pinion 243 and the gear 245 may be inclosed in a suitable casing 251 secured to a flange 253 of one of the bosses 217 of the box 191.

As stated, the shaft 229 for the sun gear 225 is held against rotation during the work feed rotation of the screw shaft. This may be accomplished by holding the armature shaft 241 of the rapid traverse motor stationary. Suitable brake means may be provided for this purpose, in the present instance of the invention, in the form of a solenoid brake (Figs. 4, 5 and 18) of usual construction, and comprising a casing 255 mounted on the motor base 239 and containing a series of rings 257 connected to the casing to prevent rotation of said rings, and a series of rings 259 alternating with the rings 257 and connected to the core of the motor to cause the same to rotate therewith. Friction linings 261 may be interposed between the series of rings. Studs 263 project through said rings and have ends secured to an armature plate 265 of a solenoid magnet 267. The armature may be provided with a coil spring 269 confined between the armature and a cover 271 secured to the casing, the construction being such that the spring tends to press the rings into close frictional engagement and act as a brake to prevent rotation of the armature shaft, and when the magnet is energized, the armature is retracted toward the magnet against the resistance of the spring to release the pressure on the rings and permit rotation of the armature shaft.

The rapid traverse motor and solenoid brake may be provided with a suitable controller 273 (Figs. 1 and 3) conveniently mounted on the rear side of the bed adjacent the controller 45 for the spindle driving motor. The controller 273 has a shaft 275 carrying a sprocket wheel 277 connected by a chain 279 with a sprocket wheel 281 on a long shaft 283 journaled in bearings on the front side of the bed. A bevel gear 285 (Fig. 13) has a long hub 287 splined to said shaft and journaled in a boss 289 on the carriage 73, referred to. The bevel gear 285 meshes with a bevel gear 291 on the lower end of a vertical shaft 293 journaled in a bearing in a spherical casing 295 inclosing said bevel gears and carried by said boss. The upper end of the shaft 293 has a handle 297 (Fig. 4) fast thereon having a pointer coöperating with a dial 299 mounted on the carriage, and marked to designate the positions of the handle. When the handle is in its mid-position, the controller is in a position to cut off the current from the rapid traverse motor and to supply current to the solenoid brake to release the same. When the handle is moved to the right, the controller is operated to interrupt the circuit to the solenoid brake to apply the same and hold the armature shaft against rotation; and when the handle is moved to the left, the controller is operated to reversely rotate the motor and produce the rapid traverse of the tail stock.

The rotation of the motor to produce the rapid traverse drives the pinion 243 on the armature shaft, the gear 245, the shaft 229 and the sun gear 225. During the rapid traverse of the tail stock and tool, the spindle driving motor should not be in operation and the spindle should not be rotated, in order to prevent injury to the bore of the gun during the withdrawal of the tool therefrom. As a consequence, the worm 205 is not rotated, and locks the worm gear 207 and the carrier for the planetary gears against rotation. As a result, the sun gear 225 rotates the planet gears about their axes, and the latter rotate the sun gear 223, the shaft 227, the bevel pinion 233, the bevel gear 235 and the screw shaft. Thus the screw shaft may be given a rapid rotation and produce a rapid traverse of the tail stock which will quickly withdraw the boring tool from the gun after completing the boring operation. The direction of the rapid traverse feed will depend upon the direction of rotation of the rapid traverse motor.

It is desirable to avoid possibility of so shifting the controller 57 and 297 as to produce simultaneous rotation of the spindle driving motor and the rapid traverse motor. For this purpose a shuttle dog 301 (Figs. 13 and 13ª) may be provided to slide in a bore 303 extending between the sleeves 61 and 287 which are fast on the controller shafts 65 and 283, respectively. The opposite ends of said dog may be tapered for entrance into similarly shaped lock seats 305 and 307 in said sleeves. The construction is such that the lock seats and dog will be in alinement when the controller shafts have been adjusted to arrest the work feed motor and to apply the brake. If the controller shaft 65 is turned to start the work feed motor, the dog will be shifted into the lock seat of the controller shaft 283, thereby preventing release of the brake or starting of the rapid traverse motor. On the other hand, if the controller shaft 283 is turned instead of the controller shaft 65, the brake may be released and the rapid traverse motor may be started, but the dog will be shifted into the lock seat of the controller shaft 65, thereby preventing starting of the work feed motor.

By the construction described, the work feed and rapid traverse feed of the tail stock may be gradually started and stopped, and the change from one to the other may be readily effected by the control handles for the motors and the solenoid brake without shock or jar to the mechanism, and without the use of the objectionable clutches, referred to. The mechanism described constitutes a simple and effective means for controlling the feeds of the tail stock, which may be readily operated and is not liable to get out of order.

The term "motor" used in certain of the claims is understood to be sufficiently comprehensive to include not only the electric motors, but other suitable forms of driving means. Obviously, the invention is adapted to be driven by other sources of power than electric motors.

It will be understood that the invention is not limited to the specific embodiment shown, but that various deviations may be made therefrom without departing from the spirit and scope of the appended claims.

What is claimed is:—

1. A machine of the character described, comprising, in combination, a tool, and means to impart a work feed and a rapid transverse feed to said tool including a screw, a differential gear mechanism comprising a rotary carrier, a worm wheel thereon, a worm to rotate said wheel, pinions, driving means for said worm, journaled in and bodily rotative with said carrier, opposed gears meshing with said pinions, shafts for said opposed gears, means to connect one of said shafts with said screw, and driving means to drive the other shaft, its gear and pinions in either direction to impart the rapid traverse feed to said screw.

2. A machine of the character described, comprising, in combination, a tool, and means to feed said tool including a screw, a differential gear mechanism comprising a rotary carrier, a pinion journaled in and bodily rotative with said carrier, opposed gears meshing with said pinion, means to rotate said carrier, means to rotate one of said gears, and means to transmit power from the other gear to said screw, one of said rotating means operable through the differential to impart a rapid traverse feed to said screw, and the other of said rotating means operable through the differential to impart a slow traverse feed to said screw.

3. A machine of the character described, comprising, in combination, a tool, and means to feed said tool including a differential gear mechanism comprising a rotary carrier, gears journaled in and bodily carried by said carrier, opposed gears meshing with said gears, a motor for rotating said carrier to impart a work feed to said tool, and a motor for rotating one of said opposed gears to impart a rapid traverse to said tool.

4. A machine of the character described, comprising, in combination, a bed, a head thereon having a spindle for rotating the work, a tail stock on said bed, a tool carried by said tail stock, a feed screw for the latter, a motor for rotating said spindle, transmission means connecting said motor with said spindle, a differential gear mechanism to transmit rotation from said transmission to said screw, and a motor connected to said differential gear mechanism to impart a rapid traverse rotation to said screw independently of said spindle motor.

5. A machine of the character described, comprising, in combination, a head having a spindle for rotating the work, a tail stock for receiving a tool to operate on the work, a feed screw for said tail stock, a motor to impart a slow feed to said screw, a motor to impart a rapid feed to said screw, transmission means including a differential gear mechanism connecting both of said motors with said screw, and means coöperating with said transmission means for rendering said motors selectively effective to feed said screw.

6. A machine of the character described, comprising, in combination, a work support, a tool support, and means to feed one relatively to the other including a screw, a slow feed motor, a rapid feed motor, and transmission means connecting said motors with said screw having means for rendering either of said motors effective to rotate said screw without interruption of their transmission connections with said screw.

7. A machine of the character described, comprising, in combination, a work support, a tool support, a screw to feed one relatively to the other, a slow feed motor, a rapid feed motor, and transmission means connecting said motors with said screw including a differential gear mechanism, and means to arrest or permit rotation of one of the gears of said mechanism at will to render said motors selectively effective to rotate said screw.

8. A machine of the character described, comprising, in combination, a work support, a tool support, and means to feed one relatively to the other including slow and rapid feed motors, a differential gear mechanism driven by said motors, and means to arrest or permit rotation of one of the gears of said mechanism to vary the speed of feed.

9. A machine of the character described, comprising, in combination, a work support, a tool support, and means to feed one relatively to the other including slow and rapid feed motors, a differential gear mechanism driven by said motors comprising opposed gears, a pinion meshing therewith, a worm wheel carrying said pinion and a worm for rotating said wheel.

10. A machine of the character described, comprising, in combination, a work support, a tool support, and means to feed one relatively to the other including a pair of motors, a differential gear mechanism driven by said motors comprising opposed gears, a pinion meshing with the latter, a worm wheel carrying said pinion, and a worm for rotating said wheel; and means to arrest one of said opposed gears or permit the same to rotate to vary the speed of feed.

11. A machine of the character described, comprising, in combination, a work support, a tool support, a pair of motors, transmission means for connecting one of said motors with said work support and tool support, and for connecting the other motor with the tool support, and means for rendering said motors alternatively effective to feed the tool support while maintaining the transmission connections from said motors to said supports.

12. A machine of the character described, comprising, in combination, a work support, a tool support, and means to feed one relatively to the other including a differential gear mechanism comprising a pair of sun gears, planetary gears meshing therewith, means to arrest one of said sun gears, means to revolve said planetary gears about said arrested sun gear to rotate the other sun gear to furnish a slow feed; and means to confine said planetary gears against revolution and to rotate one of said sun gears to drive the other sun gear through said planetary gears to furnish a rapid feed.

13. A machine of the character described, comprising, in combination, a work support, a tool support, and means to feed one relatively to the other including a sun and planet gear mechanism, means to revolve the planet gears about the axis of the sun gears to furnish a slow feed, and means to drive one of said sun gears to rotate the other sun gear to furnish a rapid feed.

14. A machine of the character described, comprising, in combination, a work support, a tool support, a motor to rotate said work support at a slow speed, a feed screw for said tool support, transmission means connecting said motor with said screw, and a motor operating through said transmission means to impart rapid rotation to said screw.

15. A machine of the character described, comprising in combination, a work support, a tool support, and means to feed one relatively to the other including a motor, transmission means connecting said motor with said support, and a motor operating through said transmission means to impart a different speed to said support from said first-named motor.

16. A machine of the character described, comprising, in combination, a work support, a tool support, a motor to rotate said work support and feed said tool support, transmission means connecting said motor with said supports including a sun and planet gear mechanism between said motor and said tool support, and a motor coöperating with said sun and planet mechanism to impart a different speed to said tool support from that had by said first-named motor.

17. A machine of the character described, comprising, in combination, a work support a tool support, and means to feed one relatively to the other including a pair of motors, a planet gear mechanism connected to said motors and having a pair of sun gears, and brake means to arrest or permit rotation of one of said sun gears to vary the speed of feed.

18. A machine of the character described, comprising, in combination, a work support, a tool support, and means to feed one relatively to the other including sun gears and planet gears, a motor connected to the planet gears to revolve the same about the axis of said sun gears, a motor having a shaft to rotate one of the sun gears, and brake means to arrest or permit said shaft to rotate.

19. A machine of the character described, comprising, in combination, a work support, a tool support, and means to feed one relatively to the other including sun gears and planet gears, a motor connected to the planet gears to revolve the same about the axis of said sun gears, a motor connected to one of said sun gears to rotate the same, and brake means to arrest the armature of said last-named motor or permit the same to rotate.

20. A machine of the character described comprising, in combination, a work support, a tool support, and means to impart either a slow or rapid feed to said tool support, comprising independently operable motors, transmission means for maintaining each of said motors in continuous positive driving connection with the tool support, including differential gear mechanism connected to said motors and tool support, and controlling means for said motors.

21. A machine of the character described, comprising, in combination, a work support, a tool support, and means to feed said tool support including relatively slow and rapid feed motors, a differential gear mechanism actuated by said motors, a brake for arresting the armature of said rapid feed motor, and controlling means for said motors and brake.

22. A machine of the character described, comprising, in combination, a work support, a tool support, a screw shaft to feed one relatively to the other, relatively slow and rapid feed motors, means including a differential gear mechanism to transmit the drive from said motors to said shaft, a carriage adjustable relatively to said supports, and means to control said motors operable from said carriage and in different positions of adjustment of the latter.

23. A machine of the character described, comprising, in combination, a work support, a tool support, a screw shaft to feed one relatively to the other, driving means for said shaft including a differential gear mechanism, a carriage adjustable relatively to said supports, and means operable from said carriage in different positions thereof for controlling said driving means.

24. A machine of the character described, comprising in combination, a work support, a tool support, and means to feed one relatively to the other including a motor, a rapid traverse motor, and means including sun and planet gear mechanism alternatively driven by said motors to produce the work feed and rapid traverse feed respectively.

25. A machine of the character described, comprising, in combination, a work support, a tool support, a feed screw shaft for the latter, a differential gear mechanism connected to said screw shaft, a motor for rotating said mechanism to impart a work feed to said shaft, and a rapid traverse motor for driving said mechanism to impart a rapid traverse feed to said shaft.

26. A machine of the character described, comprising, in combination, a work support, a tool support, a feed screw shaft for the latter, a differential gear mechanism connected to said screw shaft, a motor for rotating said work support, means to connect said motor to said mechanism to drive the latter and impart a work feed to said shaft, a rapid traverse motor, means to connect the latter to said mechanism to drive the latter and impart a rapid traverse feed to said shaft, and means to arrest said rapid traverse motor and a part of said mechanism while the first motor is driving other parts of said mechanism.

27. A machine of the character described, comprising, in combination, a work support, a tool support, a feed screw shaft for the latter, a differential gear mechanism connected to said shaft, a motor, speed change gears connecting said motor with said differential gear mechanism to impart work feeds to said screw shaft, and a rapid traverse motor connected to said differential gear mechanism to impart a rapid traverse feed to said screw shaft.

28. A machine of the character described, comprising, in combination, a work support, a tool support, a feed screw shaft for the latter, a differential gear mechanism connected to said shaft; and separate motor means operating through said differential gear mechanism to impart a work feed or a rapid traverse feed to said shaft.

29. A machine of the character described, comprising, in combination, a work support, a tool support, a feed screw shaft for the latter, a motor for rotating said work support and imparting a work feed to said shaft, a rapid traverse motor for imparting a rapid traverse feed to said shaft, a controller for said first motor, a controller for said rapid traverse motor, and means coöperating with said controllers to prevent simultaneous operation of said motors.

30. A machine of the character described, comprising, in combination, a work support, a tool support, a feed screw shaft for the latter, a motor for rotating said work support and imparting a work feed to said screw shaft, a rapid traverse motor for imparting a rapid traverse feed to said shaft, and means to prevent simultaneous operation of said motors.

31. A machine of the character described, comprising, in combination, a work support, a tool support, a feed screw shaft for the latter, a motor for rotating said work support and imparting a work feed to said screw shaft, a rapid traverse motor for imparting a rapid traverse feed to said shaft, controllers for said motors including a pair of shafts having lock seats therein, and a shuttle dog having ends coöperating with said seats for locking one of said shafts against rotation during rotation of the other shaft.

In testimony whereof, I have signed my name to this specification.

WILLIAM F. GROENE.